UNITED STATES PATENT OFFICE.

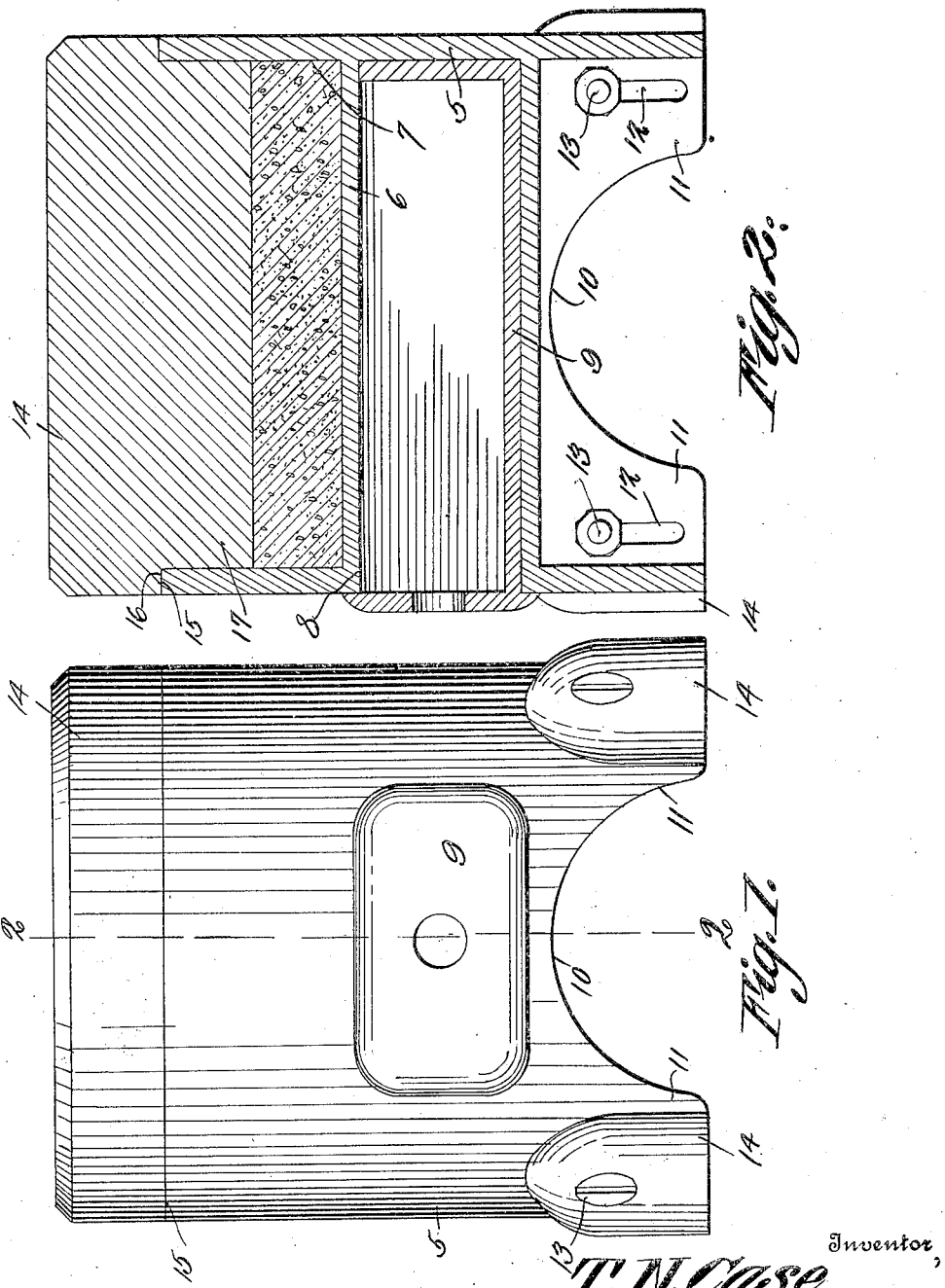

THOMAS N. CASE, OF MODESTO, CALIFORNIA.

MEAT-BLOCK.

1,326,438.   Specification of Letters Patent.   Patented Dec. 30, 1919.

Application filed September 29, 1919. Serial No. 327,135.

*To all whom it may concern:*

Be it known that I, THOMAS N. CASE, a citizen of the United States, residing at Modesto, in the county of Stanislaus and State of California, have invented a new and useful Meat-Block, of which the following is a specification.

The present invention has reference to store furniture and more particularly to devices known as meat blocks, commonly employed in butcher shops, or stores where meat is sold, for supporting meat while the same is being cut or otherwise prepared for sale.

The primary object of the invention is to provide a device of this character having a removable upper surface or head which may be readily removed and replaced in the event that irregularities develop in the head due to constant use of the block.

Another object of the invention is to provide a meat block including a body constructed of malleable iron, which body is provided with a concrete receiving chamber whereby weight is supplied to the meat block to hold the same steady when the same is being put to practical use.

A still further object of the invention is to provide a device of this character which will be adjustable to various weights, enabling the block to be adjusted vertically at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 illustrates a side elevational view of a meat block constructed in accordance with the present invention, and Fig. 2 illustrates a longitudinal sectional view on line 2—2 of Fig. 1.

Having reference to the drawing in detail, the reference character 5 designates the body of the block, which is preferably formed of malleable iron, or other metal, capable of being nickel plated whereby the appearance of the device is greatly enhanced. In the interest of economy, the body is hollow throughout a greater portion of its length, there being a partition 6 which is disposed between the inner side walls of the body, and supported therein by suitable means not shown, said partition 6 being spaced from the upper end of the body 5 to provide an upper compartment 7, which compartment is especially designed to receive or support cement, or other material which would add weight to the device, in order that the same will be held against movement on the floor on which the same is positioned, when the meat block is brought into operation.

The body 5 is provided with an opening 8 disposed therein substantially centrally of one side thereof, which opening 8 is adapted to accommodate the drawer 9, which drawer receives tools such as saws and knives necessary in the cutting of meats. The lower portion of the body 5 is cut out as at 10 to provide the legs 11, disposed at the respective corners thereof, which leg portions 11 are provided with elongated slots 12, which slots receive one extremity of the respective screws or bolts 13, the bolts 13, having engagement with the movable leg portions 14 which are curved transversely of the lengths so that the same conforms to the curvature of the body portion 5.

From the foregoing it will be seen that by loosening the bolts 13 and moving the same to predetermined positions within the slots of the legs 11, a vertical adjustment of the body 5, is provided, thereby enabling the block to be adjusted at the will of the person using the same so that the head to be hereinafter more fully described, may be brought into proper relation with the user's body.

A head 14, is preferably formed of laminated maple wood, the same being oval in formation to conform to the contour of the body 5. This head 14, is provided with an annular shoulder 15, intermediate its width, which shoulder is adapted to coöperate with the upper edge 16 of the body 5, for preventing the head 14 from moving into the body 5, the reduced portion 17 of said head 14 is adapted to be positioned within the upper end 16 of the body 5, the same being upper end 16 equal to the inner diameter of a diameter equal to the inner diameter of the upper end of the body 5 so that the same exactly fits within the upper end 16 in such a way that movement of the head 14, with relation to the body 5, is absolutely prevented.

It is obvious that due to the construction of the head 14, the head may be readily removed and replaced by a person unfamiliar with carpentry or mechanics, in the event that irregularities develop in the head due to constant use of the block.

While I have shown and described the block as oval in formation, it is to be understood that the design of the block may be changed to meet various conditions and requirements, without departing from the spirit of the invention.

Having thus described the invention, what is claimed is:—

In a meat block, a body portion, said body portion being substantially hollow and having a compartment formed in the upper portion thereof, said compartment adapted to contain a plastic material to add weight and rigidity to the block, a head block having a reduced portion fitted in the upper portion of the compartment, said reduced portion presenting shoulders, said shoulders contacting with the upper edge of the body portion of the block for restricting movement of the head block in one direction.

In testimony that I claim the foregoing as my own, I have hereto affixed my signature in the presence of two witnesses.

THOMAS N. CASE.

Witnesses:
J. T. TAYLOR,
E. J. BOUNDEY.